(12) United States Patent
Heo

(10) Patent No.: US 8,004,543 B2
(45) Date of Patent: Aug. 23, 2011

(54) IMAGE PROCESSING APPARATUS AND CONTROL METHOD THEREOF

(75) Inventor: Jae-cheol Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 793 days.

(21) Appl. No.: 11/634,174

(22) Filed: Dec. 6, 2006

(65) Prior Publication Data

US 2007/0132788 A1 Jun. 14, 2007

(30) Foreign Application Priority Data

Dec. 12, 2005 (KR) .......................... 10-2005-0121728

(51) Int. Cl.
*G09G 5/30* (2006.01)
(52) U.S. Cl. ........................................ 345/660; 345/619
(58) Field of Classification Search .................. 345/660, 345/619
See application file for complete search history.

(56) References Cited

U.S. PATENT DOCUMENTS

| | | | | |
|---|---|---|---|---|
| 5,038,209 A | * | 8/1991 | Hang | 375/240.05 |
| 5,579,029 A | * | 11/1996 | Arai et al. | 345/698 |
| 5,748,175 A | * | 5/1998 | Shimada et al. | 345/660 |
| 6,275,234 B1 | * | 8/2001 | Iwaki | 345/428 |
| 6,501,441 B1 | * | 12/2002 | Ludtke et al. | 345/1.1 |
| 6,686,936 B1 | * | 2/2004 | Nason et al. | 715/778 |
| 6,762,798 B1 | * | 7/2004 | Messer et al. | 348/565 |
| 6,903,733 B1 | * | 6/2005 | Greenberg et al. | 345/204 |
| 6,937,291 B1 | * | 8/2005 | Gryskiewicz | 348/581 |
| 6,999,105 B2 | * | 2/2006 | Buerkle et al. | 345/660 |
| 7,106,909 B2 | * | 9/2006 | Satoh et al. | 382/239 |
| 7,110,620 B2 | * | 9/2006 | Shim et al. | 382/300 |
| 7,148,929 B1 | * | 12/2006 | Mori et al. | 348/553 |
| 7,176,946 B2 | * | 2/2007 | Ha | 345/652 |
| 7,228,009 B2 | * | 6/2007 | Kim et al. | 382/300 |
| 7,236,648 B2 | * | 6/2007 | Lippincott | 382/298 |
| 7,388,623 B2 | * | 6/2008 | Uehara | 348/790 |
| 7,450,176 B2 | * | 11/2008 | Koh | 348/383 |
| 7,495,646 B2 | * | 2/2009 | Kawabe et al. | 345/95 |
| 7,538,783 B2 | * | 5/2009 | MacInnis et al. | 345/660 |
| 7,765,480 B2 | * | 7/2010 | Hasegawa et al. | 715/730 |
| 2002/0093496 A1 | * | 7/2002 | Gould | 345/204 |
| 2002/0109669 A1 | * | 8/2002 | Ha | 345/156 |
| 2002/0113933 A1 | * | 8/2002 | Waterman et al. | 349/143 |
| 2003/0052977 A1 | * | 3/2003 | Shim et al. | 348/220.1 |
| 2003/0090497 A1 | * | 5/2003 | Yoshioka | 345/660 |
| 2003/0118240 A1 | * | 6/2003 | Satoh et al. | 382/239 |
| 2003/0174202 A1 | * | 9/2003 | Eshkoli et al. | 348/14.08 |
| 2003/0218682 A1 | * | 11/2003 | Lim et al. | 348/333.11 |

(Continued)

FOREIGN PATENT DOCUMENTS

CN 1638426 7/2005

(Continued)

*Primary Examiner* — Javid A Amini
(74) *Attorney, Agent, or Firm* — Sughrue Mion, PLLC

(57) ABSTRACT

An image processing apparatus includes: a display unit which displays an image on a screen based on an input image signal; a scaler which scales the image signal to control a size of the image displayed on the screen; and a controller which controls the scaler to change the size of the displayed image at a predetermined interval of time if the image is displayed on a portion of the screen. Thus, an image processing apparatus and a control method thereof are provided which can remove an afterimage at a low manufacturing cost and with high reliability without being visually recognized.

33 Claims, 4 Drawing Sheets

U.S. PATENT DOCUMENTS

| | | | |
|---|---|---|---|
| 2004/0012614 A1* | 1/2004 | Shim et al. | 345/660 |
| 2004/0070575 A1* | 4/2004 | Sugimoto et al. | 345/204 |
| 2004/0080537 A1* | 4/2004 | Adler | 345/764 |
| 2004/0100578 A1* | 5/2004 | Park | 348/432.1 |
| 2004/0204144 A1* | 10/2004 | Lim | 455/566 |
| 2004/0207644 A1* | 10/2004 | MacInnis et al. | 345/629 |
| 2005/0024238 A1* | 2/2005 | Kimura | 340/995.1 |
| 2005/0094000 A1* | 5/2005 | Son et al. | 348/231.99 |
| 2005/0108656 A1* | 5/2005 | Wu et al. | 715/801 |
| 2005/0128530 A1* | 6/2005 | Aiba et al. | 358/471 |
| 2005/0162557 A1* | 7/2005 | Choi | 348/565 |
| 2005/0168483 A1* | 8/2005 | Hirata | 345/629 |
| 2005/0168698 A1* | 8/2005 | Nagayoshi | 353/30 |
| 2005/0195221 A1* | 9/2005 | Berger et al. | 345/660 |
| 2006/0001781 A1* | 1/2006 | Uehara | 348/790 |
| 2006/0012616 A1* | 1/2006 | Paek | 345/698 |
| 2006/0037050 A1* | 2/2006 | Bae et al. | 725/62 |
| 2006/0061687 A1* | 3/2006 | Dunton | 348/564 |
| 2006/0077213 A1* | 4/2006 | Li | 345/660 |
| 2006/0093224 A1* | 5/2006 | Uchino | 382/232 |
| 2006/0103644 A1* | 5/2006 | Choi | 345/214 |
| 2006/0115173 A1* | 6/2006 | Obara | 382/254 |
| 2006/0170710 A1* | 8/2006 | Chao et al. | 345/660 |
| 2006/0220923 A1* | 10/2006 | Tanizaki et al. | 340/995.1 |
| 2006/0221237 A1* | 10/2006 | Min et al. | 348/565 |
| 2006/0244817 A1* | 11/2006 | Harville et al. | 348/14.08 |
| 2007/0076020 A1* | 4/2007 | Fleming et al. | 345/698 |
| 2007/0097326 A1* | 5/2007 | Yang | 353/69 |
| 2007/0118821 A1* | 5/2007 | Yee et al. | 715/864 |
| 2007/0126712 A1* | 6/2007 | Park et al. | 345/173 |
| 2008/0018671 A1* | 1/2008 | Miake et al. | 345/661 |
| 2008/0216011 A1* | 9/2008 | Gould | 715/786 |
| 2009/0252391 A1* | 10/2009 | Matsuda et al. | 382/131 |

FOREIGN PATENT DOCUMENTS

| | | |
|---|---|---|
| JP | 07-046510 A | 2/1995 |
| JP | 2000-175122 A | 6/2000 |
| JP | 2003-177715 A | 6/2003 |
| JP | 2003-274315 A | 9/2003 |
| KR | 10-2003-0032564 A | 4/2003 |
| KR | 10-2004-0019747 A | 3/2004 |
| KR | 10-2004-0026059 A | 3/2004 |
| KR | 10-2004-0029759 A | 4/2004 |
| KR | 10-2005-0048300 A | 5/2005 |
| KR | 10-2005-0112251 A | 11/2005 |

* cited by examiner

IMAGE PROCESSING APPARATUS AND CONTROL METHOD THEREOF

CROSS-REFERENCE TO RELATED APPLICATIONS

This application claims priority from Korean Patent Application No. 2005-0121728, filed on Dec. 12, 2005 in the Korean Intellectual Property Office, the disclosure of which is incorporated herein by reference.

BACKGROUND OF THE INVENTION

1. Field of the Invention

Apparatuses and methods consistent with the present invention relate to image processing, and more particularly, to an image processing apparatus and a control method thereof, which can remove an afterimage.

2. Description of the Related Art

An image processing apparatus such as a television (TV) set receives an image signal from a broadcast station, or a video signal from an external image device such as a video cassette recorder (VCR), a digital versatile disc (DVD) player, a personal computer (PC), etc., and performs an image processing appropriate for the received image signal to display the image based on the processed image signal. According to the input image signal, the image processing apparatus performs the image processing including analog-to-digital (AD) conversion, decoding, etc., and performs scaling of the processed image signal to thus display the image on a screen at a proper resolution.

The image processing apparatus includes a display unit having a display screen on which images are displayed based on the image signal. The image processing apparatus displays the images on the entire screen or in partial areas of the screen, according to selection of a user. For example, in the case that an aspect ratio of a screen is 16:9 and an input image signal has an aspect ratio of 4:3, the image processing apparatus can display the image with the aspect ratio of 4:3, according to selection of a user. In this case, as shown in FIG. 1, due to a difference in the aspect ratio between the screen 11 and the image 13, the image processing apparatus does not display the image on a part of the screen 11, that is, on sides 12a and 12b of the screen having a predetermined width in the horizontal direction, but instead displays the image only on a middle area 13 of the screen.

In this state, when another image is displayed after a still image is especially displayed for a predetermined time, there may occur a phenomenon that a pattern of the previous image remains. This phenomenon is called an "afterimage" or "image sticking." Particularly, such an afterimage can be prominent in the case that the display unit is implemented as a liquid crystal display (LCD) panel, a plasma display panel (PDP), etc. The afterimage causes the problem of damage of pixels in which the afterimage is displayed, as well as deterioration of image quality.

As a related art technology for removing the afterimage, Korea Patent Laid-Open Publication No. 2005-112251 discloses a technique for detecting a portion corresponding to an image having high luminance locally or all on the entire screen over a predetermined time and controlling the number of luminance and drive sustain pulses to prevent the afterimage and the damage of the screen.

As another related art technology, Japanese Patent Laid-Open Publication No. 2003-274315 discloses a technique for preventing an afterimage of a boundary portion and damage of the screen by moving the location of a portion at which an image exists at a predetermined interval of time.

However, these related art techniques need separate hardware or software with a complicated algorithm, which results in increased manufacturing costs.

Moreover, Japanese Patent Laid-Open Publication No. 2003-274315 has a problem in that the whole motion of the image is recognized by the eyes of a viewer, thus deteriorating the image quality.

As still another related art technology for removing an afterimage, Korea Patent Laid-Open Publication No. 2004-019747 discloses a technique for moving one pixel column of a boundary portion by one pixel to the left or right to thereby prevent an afterimage and damage of a picture.

However, Korea Patent Laid-Open Publication No. 2004-019747 has a problem in that the afterimage generated in pixels except the moved pixel column can not be removed.

SUMMARY OF THE INVENTION

The present invention provides an image processing apparatus and a control method thereof, which can remove an afterimage at a low manufacturing cost and with high reliability without being visually recognized.

According to an aspect of the present invention, there is provided an image processing apparatus comprising: a display unit for displaying an image on a screen based on an input image signal; a scaler for scaling the image signal to control a size of the image displayed on the screen; and a controller for controlling the scaler such that the size of the displayed image is changed at a predetermined interval of time in the case that the image is displayed on a portion of the screen.

The controller may control the scaler such that the size of the image is changed with a predetermined change rate.

The controller may control the scaler such that the amount of change per one time in the size of the image is below a limit to which the user recognizes the change.

The limit to which the user recognizes the change may be five pixels.

The controller may control the scaler such that the total amount of change in the size of the image is below a range in which an afterimage is expected to occur on the screen.

The range in which the afterimage is expected to occur may be about 10% of the size of the image in a predetermined direction.

The controller may control the scaler such that frequency of the change in the size of the image is once or less per ten minutes.

The controller may control the scaler such that the size of the image is symmetrically changed from the center of the image.

The controller may control the scaler such that the size of the image is changed in at least one of horizontal and vertical directions.

The display unit may comprise a liquid crystal display (LCD) panel or a plasma display panel (PDP).

The aspect ratio of the screen may be a wide-screen aspect ratio, and the controller may control the scaler such that the size of the displayed image can be changed when an aspect ratio of 4:3 is selected by the user.

According to another aspect of the present invention, there is provided a control method of an image processing apparatus comprising a display unit for displaying an image on a screen based on an input image signal, and a scaler for scaling the image signal to control a size of the image displayed on the screen, the control method comprising: displaying the image on a portion of the screen; and controlling the scaler such that the size of the displayed image is changed at a predetermined interval of time.

The controlling the scaler may comprise changing the size of the image with a predetermined change rate.

The controlling the scaler may comprise maintaining the amount of change per one time in the size of the image below a limit to which the user recognizes the change.

The controlling the scaler may comprise maintaining the total amount of change in the size of the image below a range in which an afterimage is expected to occur on the screen.

The controlling the scaler may comprise maintaining frequency of the change in the size of the image once or less per ten minutes.

The controlling the scaler may comprise changing the size of the image symmetrically from the center of the image.

The controlling the scaler may comprise changing the size of the image in at least one of horizontal and vertical directions.

The display unit may comprise an LCD panel or a PDP.

The aspect ratio of the screen may be a wide-screen aspect ratio, and wherein the controlling the scaler may comprise changing the size of the displayed image when the aspect ratio of 4:3 is selected by a user.

BRIEF DESCRIPTION OF THE DRAWINGS

The above and/or other aspects of the present invention will become apparent and more readily appreciated from the following description of the exemplary embodiments, taken in conjunction with the accompanying drawings of which.

DETAILED DESCRIPTION OF EXEMPLARY EMBODIMENTS OF THE INVENTION

Figure 1:
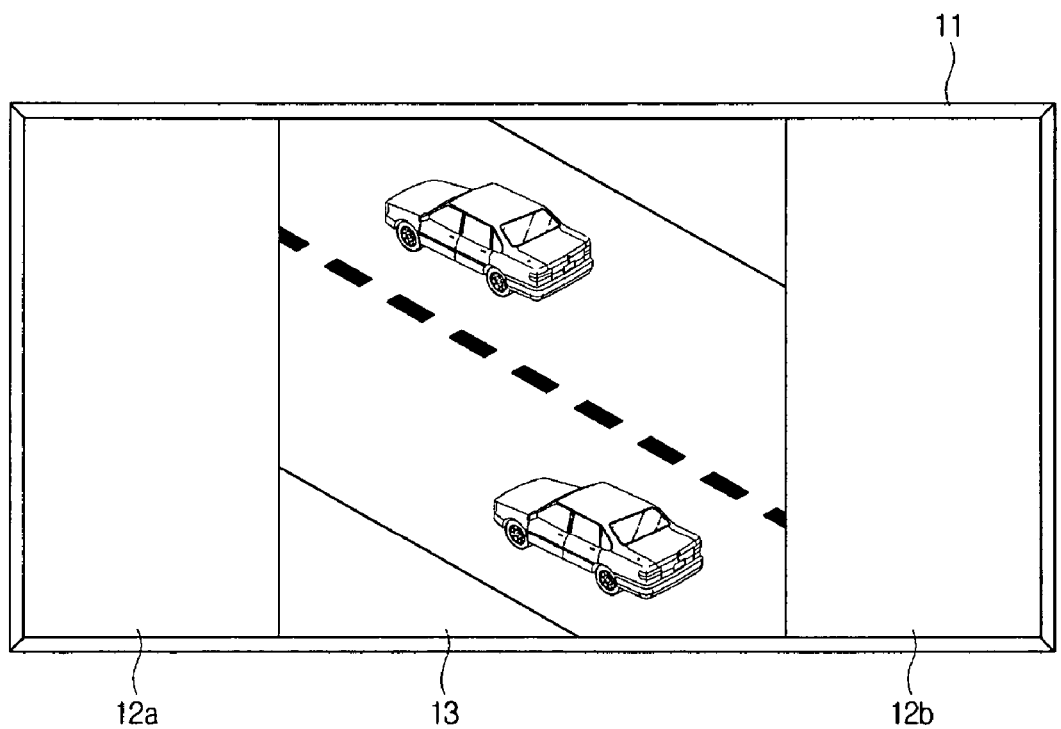
FIG. 1 shows an image displayed on a display unit of a related art image processing apparatus.

Reference will now be made in detail to exemplary embodiments of the present invention, examples of which are illustrated in the accompanying drawings, wherein like reference numerals refer to like elements throughout.

Figure 2:
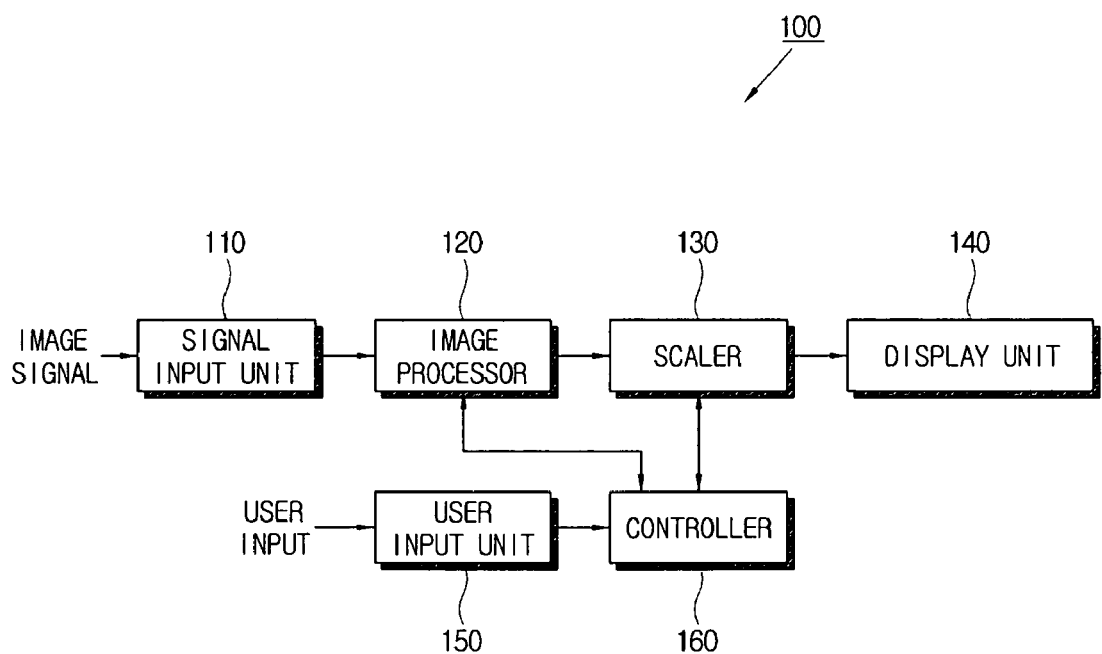
FIG. 2 is a block diagram showing a configuration of an image processing apparatus according to an exemplary embodiment of the present invention.

FIG. 2 is a block diagram showing a configuration of an image processing apparatus 100 by an exemplary embodiment of the present invention. The image processing apparatus 100 receives an image signal from a broadcast station, and/or from an external image device such as a VCR, a DVD player, or a PC, and performs a suitable image processing for the received image signal to be displayed on a screen based on the processed image signal. The image processing apparatus 100 may be implemented as a TV, for example.

As shown in FIG. 2, the image processing apparatus 100 includes a signal input unit 110, an image processor 120, a scaler 130, a display unit 140, a user input unit 150 and a controller 160. The signal input unit 110 receives an image signal. The signal input unit 110 may include a tuner (not shown) receiving a TV image signal from a broadcast station. The signal input unit 110 may receive an image signal from an external image device such as a VCR, a DVD; or a PC. In this case, the signal input unit 110 may include a connection terminal (not shown) for connection with the external image device.

The image processor 120 receives the image signal from the signal input unit 110, and processes the image signal in order to be transformed to an image signal which can be processed by the scaler 120. For example, the image processor 120 can perform decoding for extracting image information from the received image signal.

The scaler 130 receives the image signal from the image processor 120, and performs scaling for the image signal so that the size of the image displayed on the display unit 140 can be changed under the control of the controller 160.

The display unit 140 displays an image on the screen based on the image signal processed by the scaler 130. The display unit 140 may be implemented as an LCD panel, a PDP or the like.

The user input unit 150 receives instructions from a user and delivers information corresponding to the received instructions to the controller 160. The user input unit 150 receives a user's selection signal concerning the size of the image displayed on the screen of the display unit 140. For example, the user input unit 150 can receive one of aspect ratios of 4:3 and 16:9 selected by the user. The user input unit 150 may be implemented as a remote controller, a manipulation panel or the like.

The controller 160 controls the overall operation of other components of the image processing apparatus 100. According to the selection of the user through the user input unit 150, the controller 160 can display an image on a partial area of the screen of the display unit 140. In this case, the controller 160 controls the scaler 130 so that the size of the image displayed on the screen can be changed.

Figure 3:
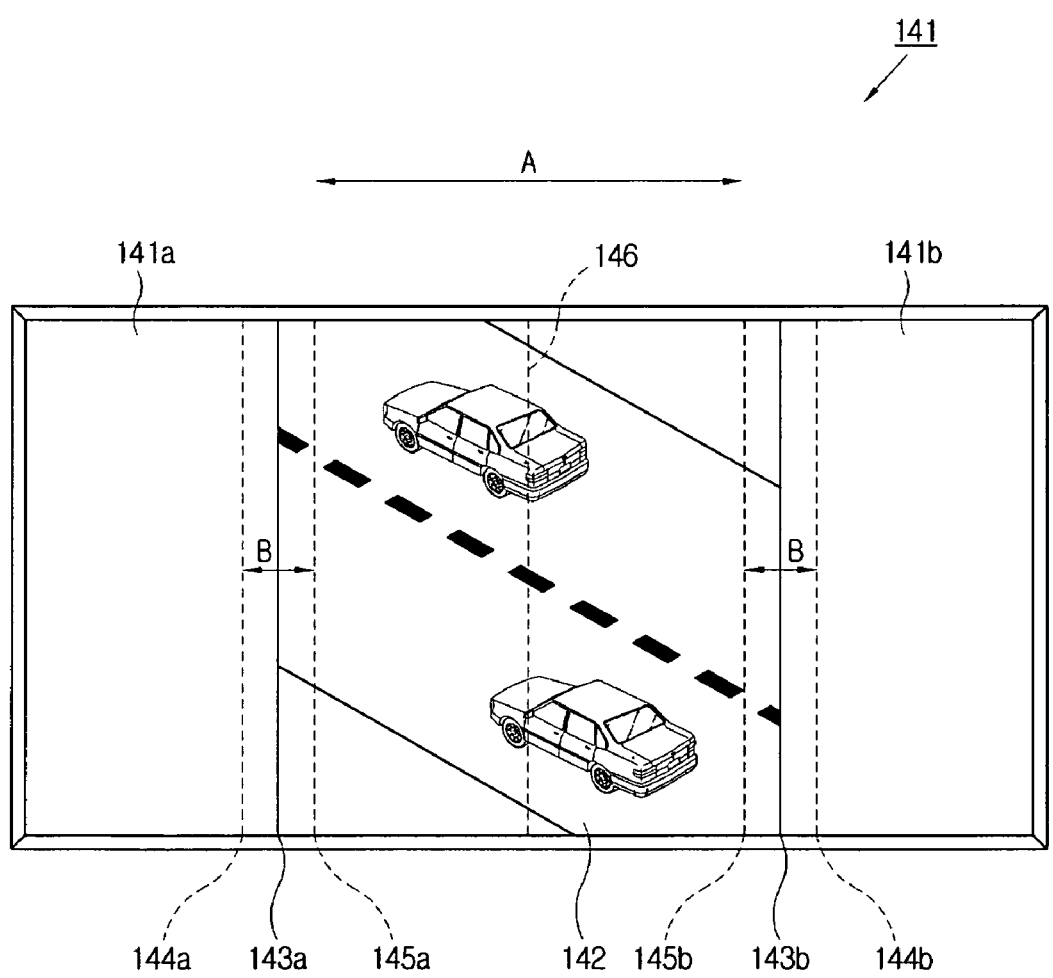
FIG. 3 shows an image displayed on a display unit of an image processing apparatus according to an exemplary embodiment of the present invention.

FIG. 3 shows an image 142 displayed on the screen 141 of the display unit 140 according to the exemplary embodiment. For example, it is assumed that the screen 141 has an aspect ratio of 16:9 and the user selects an aspect ratio of 4:3. The controller 160 controls the scaler 130 in a manner that the size of the image 142 in the horizontal direction A is symmetrically changed from the center 146 of the image 142. In this case, the scaler 130 applies a predetermined horizontal scale factor to the image 142 to change the size of the image 142 in the horizontal direction A. The size of the image 142 in the horizontal direction A becomes larger as the horizontal scale factor becomes larger, while the size of the image 142 in the horizontal direction A becomes smaller as the horizontal scale factor becomes smaller. In this case, the center 146 of the image 142 is fixed, and the right and left boundaries of the image 142 move in such a manner that they become further from or closer to the center 146 in the direction A in proportion to the horizontal scale factor.

When the right and left boundaries of the image 142 are in middle positions 143a and 143b, respectively, the controller 160 can control the scaler 130 to increase the horizontal scale factor so that the right and left boundaries of the image 142 move toward the maximum positions 144a and 144b, respectively. When the right and left boundaries of the image 142 reach the respective maximum positions 144a and 144b, the controller 160 can control the scaler 130 to decrease the horizontal scale factor so that the right and left boundaries of the image 142 move toward the minimum locations 145a and 145b, respectively. When the right and left boundaries of the image 142 reach the respective minimum positions 145a and 145b, the controller 160 can control the scaler 130 to increase the horizontal scale factor again so that the right and left boundaries of the image 142 move toward the respective maximum positions 144a and 144b.

The controller 160 can control the scaler 130 such that the size of the image 142 can be changed by a predetermined amount of variation one time. For example, the controller 160 can control the scaler 130 such that the right and left boundaries of the image 142 move by the predetermined number of pixels whenever the size of the image 142 is changed once. In this case, it is preferable but not necessary that the controller 160 controls the scaler 130 such that the amount of change in the size of the image 142 is less than limit of a change that a user recognizes. In this exemplary embodiment, the limit of the change that the user recognizes is proportional to the size of the screen 141 of the display unit 140, and, for example, may be one through five pixels.

Moreover, it is preferable but not necessary that the controller 160 controls the scaler 130 such that the total variation in the size of the image 142 is below a range in which an afterimage is expected to occur on the screen 141. In this exemplary embodiment, the range in which the afterimage is expected to occur may be the range of 10% or so of the size of the image 142 in the horizontal direction A. That is, the range in which the afterimage is expected to occur may be the range of 5% or so of the size of the image 142 in the horizontal direction A bi-directionally from the middle position 143a or 143b of the left or right boundary of the image 142. In FIG. 3, the range in which the afterimage is expected to occur is denoted by "B."

The controller 160 can control the scaler 130 such that the size of the image 142 can be changed with a predetermined change rate. In this case, whenever the controller 160 changes the size of the image 142, it can deliver the horizontal scale factor determined according to the following Equation 1 to the scaler 130.

Horizontal scale factor=Prior horizontal scale factor*Variation ratio   [Equation 1]

Moreover, the controller 160 can control the scaler 130 such that the size of the image 142 can be changed with predetermined frequency. It is preferable but not necessary that the frequency of the change in the size of the image 142 is above a degree that an afterimage is not generated on the screen 141, or below a degree that power wastefulness or operation loss due to unnecessary change of the image is not generated. In this exemplary embodiment, the controller 160 controls the scaler 130 such that the frequency of the change in the size of the image 142 becomes one-time or less per 10 minutes.

In this exemplary embodiment, the controller 160 can be implemented with a computer program executed by a microprocessor such as a central processing unit (CPU). In this case, the computer program may be stored in a memory such as a read only memory (ROM).

Figure 4:
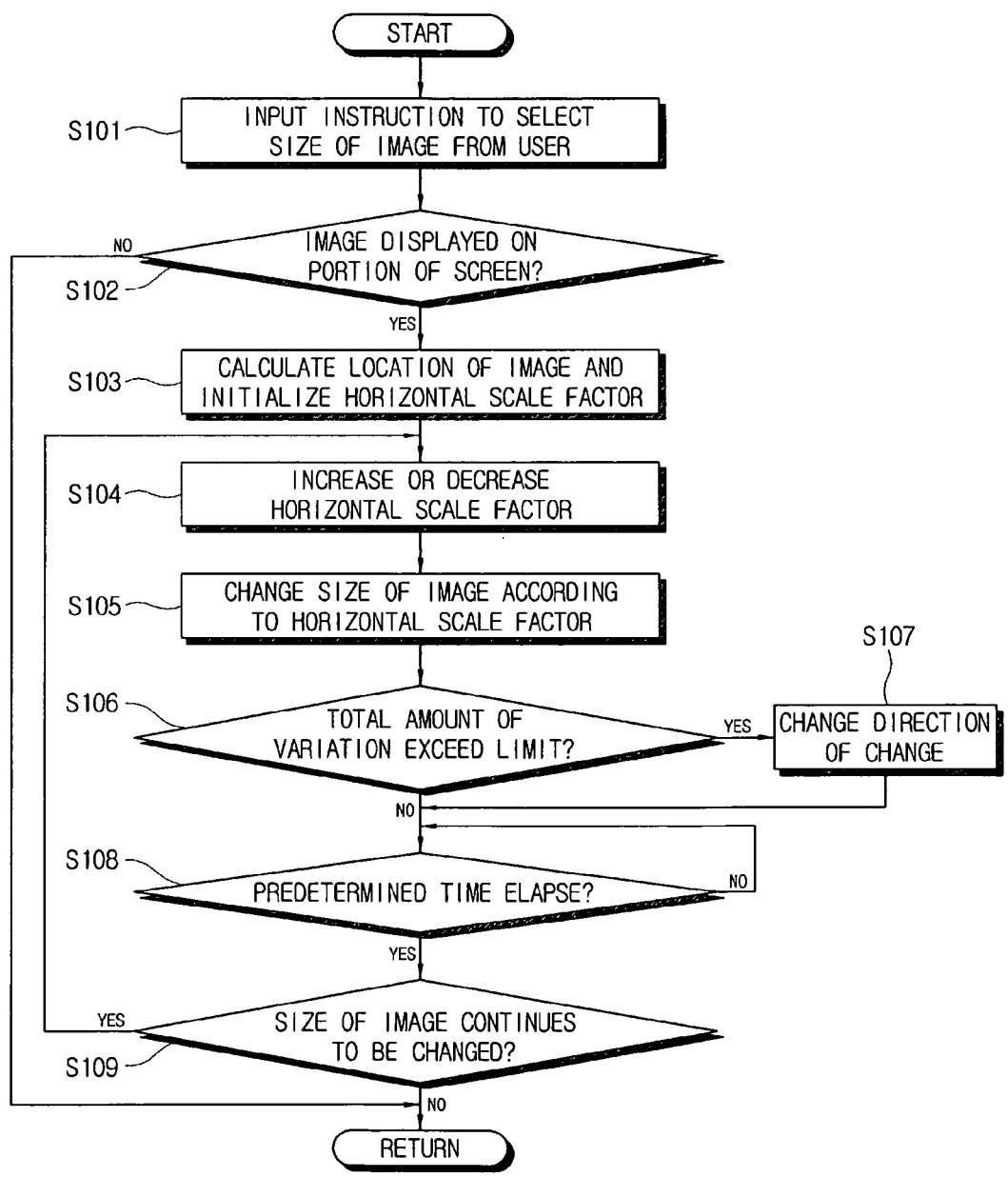
FIG. 4 is a flowchart illustrating a control method of an image processing apparatus according to an exemplary embodiment of the present invention.

FIG. 4 is a flowchart illustrating a control method of the image processing apparatus 100 according to an exemplary embodiment. If an instruction to select a display size of an image on a screen is input from a user at operation S101, the controller 160 determines whether the selection instruction is an instruction to display the image on a portion of the screen at operation S102. If it is determined that the selection instruction is not an instruction to display the image on a portion of the screen, the operation is repeated. For example, the controller 160 determines whether a user chooses to display an image with the aspect ratio of 4:3 on the screen of the aspect ratio 16:9.

If the controller 160 determines that the selection instruction is the instruction to display the image on the portion of the screen at the operation S102, it calculates a location of the image and initializes a scale factor at operation S103. For example, when the image with the aspect ration of 4:3 is selected to be displayed on the screen with the aspect ratio of 16:9, the controller 160 initializes a horizontal scale factor.

The controller 160 increases or decreases the scale factor with a predetermined change rate at operation S104 and applies the scale factor to the image to change the size of the image at operation S105. For example, the controller 160 multiplies the horizontal scale factor by a predetermined variation ratio according to the above Equation 1 to determine the horizontal scale factor, and then applies the determined horizontal scale factor to the image to change the size of the image.

The controller 160 determines whether the total amount of variation in the size of the image exceeds a range in which an afterimage is expected to occur at operation S106. If it is determined that the total amount of variation exceeds the range in which the afterimage is expected to occur, the controller 160 changes the variation direction of the horizontal scale factor at operation S107. For example, the controller 160 inverts the sign of the variation ratio if the total amount of variation in the size of the image exceeds the predetermined number of pixels.

If the controller 160 determines that the total amount of variation is below the range in which the afterimage is expected to occur, it determines whether a time, for example, ten minutes, for which the size of the image is changed with predetermined frequency elapses at operation S108.

The controller 160 can control the signal input unit 110, the image processor 120 and so on such that typical operations of the image processing apparatus 100, for example, processing and display of an image signal from the TV, in parallel to the performance at the operation S108.

If the controller 160 determines that the set time elapses, then it confirms whether or not the size of the image has to continue to be changed at operation S109. For example, the controller 160 returns the operation if it determines that the screen with the aspect ratio of 16:9 is selected by the user. If other selection instructions are not input from the user, the controller 160 determines that the size of the image has to continue to be changed, and then repeats operations S104 through S109.

As apparent from the above description, the exemplary embodiments of the present invention provides an image processing apparatus and a control method thereof, which are capable of removing an afterimage at a low manufacturing cost and with high reliability without being visually recognized.

Although exemplary embodiments of the present invention have been shown and described, it will be appreciated by those skilled in the art that changes may be made in the exemplary embodiments without departing from the principles and spirit of the invention, the scope of which is defined in the appended claims and their equivalents. For example, the present invention is not limited to only the case that the size of an image is changed to the horizontal direction, but may also be applied to a case that the size of the image can be changed in the vertical direction.

What is claimed is:

1. An image processing apparatus comprising:
 a display unit which displays an image on a screen based on an input image signal;
 a scaler which scales the image signal to control a display size of the image displayed on the screen; and
 a controller which controls the scaler to change the display size of the displayed image at a predetermined interval of time while the image is being displayed on the screen, wherein the scaler applies a first scale factor to the image signal to change the display size of the displayed image to a first display size, when the first scale factor is applied to the image signal, the controller starts a counter and determines whether the predetermined interval of time has lapsed based on the counter, and when the controller determines that the predetermined interval of time has lapsed while the first scale factor is set, the controller controls the scaler to apply a second scale factor to the image signal to change the display size of the displayed image from the first display size to a second display size, and wherein the controller controls the scaler so that the display size of the image is symmetrically changed from a center line of the image such that the display size of the image is symmetrically changed by moving both a first boundary of the image and a second boundary of the image, located on an opposite side of the image, further from or closer to the center line such that the first boundary and the second boundary are equally extended from or retracted toward the center line according to the scaler, and wherein a third boundary and a fourth boundary of the image remain stationary while the first boundary and the second boundary are moved.

2. The image processing apparatus according to claim 1, wherein the controller controls the scaler to change the display size of the image with a predetermined change rate.

3. The image processing apparatus according to claim 1, wherein the controller controls the scaler so that each time the display size of the image is changed, an amount of change of the display size of the image is below a limit to which the user recognizes the change, and the limit to which the user recognizes the change is proportional to a size of the screen.

4. The image processing apparatus according to claim 3, wherein the limit to which the user recognizes the change is five pixels.

5. The image processing apparatus according to claim 1, wherein the controller controls the scaler so that a total amount of change of the display size of the image is below a range in which an afterimage occurs on the screen.

6. The image processing apparatus according to claim 5, wherein the range in which the afterimage occurs is approximately 10% of an unscaled display size of the image displayed on the screen in a predetermined direction, wherein the unsealed display size is a display size of the displayed image when no scale factor is applied to the image signal.

7. The image processing apparatus according to claim 1, wherein the controller controls the scaler so that a frequency of the change in the display size of the image is once per ten minutes or less than once per ten minutes.

8. The image processing apparatus according to claim 1, wherein the controller controls the scaler so that the display size of the image is changed in at least one of a horizontal direction and a vertical direction.

9. The image processing apparatus according to claim 1, wherein the display unit comprises a liquid crystal display panel or a plasma display panel.

10. The image processing apparatus according to claim 1, wherein an aspect ratio of the screen is a wide-screen aspect ratio, and the controller controls the scaler so that the display size of the displayed image can be changed when an aspect ratio of 4:3 is selected by the user.

11. The image processing apparatus according to claim 1, wherein the controller controls the scaler to change between at least two scale factors applied to the image signal to change the display size of the image at the predetermined interval of time.

12. The image processing apparatus according to claim 1, wherein the first and second boundaries are moved by a predetermined number of pixels in a predetermined direction, in symmetrical proportions from the center line.

13. The image processing apparatus according to claim 1, wherein the controller controls the scaler to repeatedly change between the first scale factor and the second scale factor, which are applied by the scaler to the image signal in turn, at a frequency of the change in the display size of the displayed image such that an amount of time between changes is less than an amount of time an afterimage is expected to occur and more than an amount of time corresponding to a predetermined degree of power wastefulness.

14. The image processing apparatus according to claim 1, wherein the controller sets a frequency of the change in the display size of the displayed image and controls the scaler to repeatedly change between the first scale factor and the second scale factor, which are applied by the scaler to the image signal in turn, at the frequency, so that the image being displayed on the screen repeatedly changes in the display size at the frequency.

15. The image processing apparatus according to claim 1, wherein, when the second scale factor is applied to the image signal, the controller restarts the counter and determines whether the predetermined interval of time has lapsed based on the counter, and when the controller determines that the predetermined interval of time has lapsed while the second scale factor is set, the controller controls the scaler to apply the first scale factor to the image signal to change the display size of the displayed image from the second display size to the first display size, when the first scale factor is applied to the image signal, the controller restarts the counter and determines whether the predetermined interval of time has lapsed based on the counter, and when the controller determines that the predetermined interval of time has lapsed while the first scale factor is set, the controller controls the scaler to apply the second scale factor to the image signal to change the display size of the displayed image from the first display size to the second display size.

16. The image processing apparatus according to claim 15, wherein controller controls the scaler to continuously change a plurality of times between the first scale factor and the second scale factor to be applied to the image signal by restarting the counter and changing the display size of the displayed image when the predetermined interval of time has lapsed.

17. The image processing apparatus according to claim 1, wherein the first display size and the second display size are different from an unscaled display size which is a display size of the displayed image when no scale factor is applied to the image signal.

18. The image processing apparatus according to claim 1, wherein one of the first display size and the second display size is greater than an unscaled display size which is a display size of the displayed image when no scale factor is applied to the image signal, and the other one of the first display size and the second display size is less than the unsealed display size.

19. A control method of an image processing apparatus comprising a display unit which displays an image on a screen based on an input image signal, and a scaler which scales the image signal to control a display size of the image displayed on the screen, the control method comprising:

displaying the image on the screen; and controlling the scaler to change the display size of the displayed image at a predetermined interval of time while the image is being displayed on the screen, wherein the controlling the scaler comprises:
applying a first scale factor to the image signal to change the display size of the displayed image to a first display size,
when the first scale factor is applied to the image signal, starting a counter and determining whether the predetermined interval of time has lapsed based on the counter, and
when the predetermined interval of time is determined to have lapsed while the first scale factor is set, applying a second scale factor to the image signal to change the display size of the displayed image from the first display size to a second display size, and
wherein the controlling the scaler comprises changing the display size of the image symmetrically from a center line of the image such that the display size of the image is symmetrically changed by moving both a first boundary of the image and a second boundary of the image, located on an opposite side of the image, further from or closer to the center line such that the first boundary and the second boundary are equally extended from or retracted toward the center line according to the scaler, and
wherein a third boundary and a fourth boundary of the image remain stationary while the first boundary and the second boundary are moved.

20. The control method according to claim 19, wherein the controlling the scaler comprises changing the display size of the image with a predetermined change rate.

21. The control method according to claim 19, wherein the controlling the scaler comprises maintaining an amount of change of the display size of the image below a limit to which the user recognizes the change each time the display size of the image is changed, and the limit to which the user recognizes the change is proportional to a size of the screen.

22. The control method according to claim 21, wherein the limit to which the user recognizes the change is five pixels.

23. The control method according to claim 19, wherein the controlling the scaler comprises maintaining a total amount of change of the display size of the image below a range in which an afterimage occurs on the screen.

24. The control method according to claim 23, wherein the range in which the afterimage occurs is approximately 10% of an unscaled display size of the image displayed on the screen in a predetermined direction, wherein the unscaled display size is a display size of the displayed image when no scale factor is applied to the image signal.

25. The control method according to claim 19, wherein the controlling the scaler comprises maintaining a frequency of the change in the display size of the image once per ten minutes or less than once per ten minutes.

26. The control method according to claim 19, wherein the controlling the scaler comprises changing the display size of the image in at least one of a horizontal direction and a vertical direction.

27. The control method according to claim 19, wherein the display unit comprises a liquid crystal display panel or a plasma display panel.

28. The control method according to claim 19, wherein an aspect ratio of the screen is a wide-screen aspect ratio, and
wherein the controlling the scaler comprises changing the display size of the displayed image when an aspect ratio of 4:3 is selected by a user.

29. The control method according to claim 19, wherein the controlling the scaler further comprises:
when the second scale factor is applied to the image signal, restarting the counter and determining whether the predetermined interval of time has lapsed based on the counter, and
when the predetermined interval of time is determined to have lapsed while the second scale factor is set, applying the first scale factor to the image signal to change the display size of the displayed image from the second display size to the first display size,
when the first scale factor is applied to the image signal, restarting the counter and determining whether the predetermined interval of time has lapsed based on the counter, and
when the predetermined interval of time is determined to have lapsed while the first scale factor is set, applying the second scale factor to the image signal to change the display size of the displayed image from the first display size to the second display size.

30. The control method according to claim 29, wherein the scaler is controlled to continuously change a plurality of times between the first scale factor and the second scale factor to be applied to the image signal by restarting the counter and changing the display size of the displayed image when the predetermined interval of time is determined to have lapsed.

31. The control method according to claim 19, wherein the first display size and the second display size are different from an unscaled display size which is a display size of the displayed image when no scale factor is applied to the image signal.

32. The control method according to claim 19, wherein one of the first display size and the second display size is greater than an unscaled display size which is a display size of the displayed image when no scale factor is applied to the image signal, and the other one of the first display size and the second display size is less than the unscaled display size.

33. An image processing apparatus comprising:
a display unit which displays an image on a screen based on an input image signal;
a scaler which scales the image signal to control a display size of the image displayed on the screen; and
a controller which controls the scaler to change the display size of the displayed image at a predetermined interval of time while the image is being displayed on the screen,
wherein the controller controls the scaler to repeatedly change a scale factor applied to the image signal a plurality of times by alternating between two scale factors applied to the image signal at the predetermined interval of time to repeatedly change the display size of the image at the predetermined interval of time according to the change in the scale factor, and
wherein the controller controls the alternating between the two scale factors such that a time between each change in the scale factor is the predetermined interval of time, and wherein the controller controls the scaler so that the display size of the image is symmetrically changed from a center line of the image such that the display size of the image is symmetrically changed by moving both a first boundary of the image and a second boundary of the image, located on an opposite side of the image, further from or closer to the center line such that the first boundary and the second boundary are equally extended from or retracted toward the center line according to the scaler, and
wherein a third boundary and a fourth boundary of the image remain stationary while the first boundary and the second boundary are moved.

* * * * *